United States Patent [19]

Nonn et al.

[11] 3,963,430

[45] June 15, 1976

[54] CONCENTRATED SOLUTIONS, MISCIBLE WITH WATER IN ANY RATIO OF ANIONIC DYESTUFFS

[75] Inventors: Konrad Nonn; Kuno Wagner, both of Leverkusen, Germany

[73] Assignee: Bayer Aktiengesellschaft, Leverkusen, Germany

[22] Filed: May 8, 1975

[21] Appl. No.: 575,703

[30] Foreign Application Priority Data

May 9, 1974 Germany............................ 2422386

[52] U.S. Cl. ................................... 8/39 R; 8/41 R; 8/85 B; 8/93
[51] Int. Cl.² ....................... C09B 5/62; D06P 1/02
[58] Field of Search ................. 8/39, 41 R, 85 B, 93

[56] References Cited
UNITED STATES PATENTS

| 2,225,604 | 12/1940 | Lubs et al. ................................ 8/85 |
| 2,290,945 | 7/1942 | Dahlen et al. ............................ 8/62 |
| 2,888,313 | 5/1959 | Mautner ................................... 8/54 |

FOREIGN PATENTS OR APPLICATIONS

| 766,550 | 9/1971 | Belgium |
| 2,061,760 | 6/1972 | Germany |
| 2,062,288 | 7/1972 | Germany |
| 7,117,387 | 6/1972 | Netherlands |
| 1,060,063 | 2/1967 | United Kingdom |

OTHER PUBLICATIONS

Rattee and Breuer, "The Physical Chemistry of Dye Adsorption," (Academic Press, 1974) pp. 133-137.

*Primary Examiner*—Joseph L. Schofer
*Assistant Examiner*—A. L. Clingman
*Attorney, Agent, or Firm*—Plumley and Tyner

[57] ABSTRACT

Stable, concentrated solutions, miscible with water in any ratio, of azo and anthraquinone dyestuffs containing sulphonic acid groups are obtained by means of association compounds of lactams with polyalcohols, optionally with water and optionally with further water-miscible organic solvents.

5 Claims, No Drawings

CONCENTRATED SOLUTIONS, MISCIBLE WITH WATER IN ANY RATIO OF ANIONIC DYESTUFFS

The invention relates to concentrated dyestuff solutions, miscible with water in any ratio, of azo dyestuffs containing sulphonic acid groups and anthraquinone dyestuffs containing sulphonic acid groups, and to their use for dyeing natural or synthetic fibre materials containing nitrogen and natural or synthetic fibre materials containing hydroxyl groups.

The dyestuff solutions are characterised in that they contain, in addition to the azo dyestuffs containing sulphonic acid groups and anthraquinone dyestuffs containing sulphonic acid groups, association compounds of lactams with polyalcohols, and, optionally, water, and, optionally, further water-miscible organic solvents.

The dyestuffs containing sulphonic acid groups can be used in the form of their alkali metal salts, for example the sodium salts, potassium salts or lithium salts, but advantageously in the form of their amine salts, such as are described, for example, in German Offenlegungsschrift (German Published Specification) No. 2,061,760. It is frequently advantageous to pretreat the dyestuff with dilute mineral acid, especially hydrochloric acid, before forming the amine salt.

The ε-lactam/polyalcohol association compounds are known from German Offenlegungsschrift No. 2,062,288. Such association compounds consist preferably of 1 mol of lactams of the formula

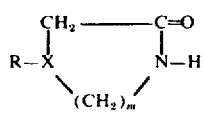

wherein
X denotes a CH group,
R denotes hydrogen and
m denotes a number from 0 to 9 or
X denotes a nitrogen atom,
R denotes an aliphatic radical with 1–6 carbon atoms and
m denotes the number 3,
and 0.5 to 4 mols, preferably 1–2 mols, of polyalcohols which optionally contain basic groups.

In the case of the preferentially used ε-caprolactam and of bifunctional alcohols, these association compounds are liquids of extremely low viscosity, which can approximately be described by the following formula:

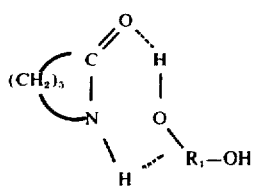

II wherein
$R_1$ represents the radical of a polyalcohol which optionally contains sulphur, nitrogen and oxygen atoms.

In the case of amino alcohols with a NH or $NH_2$ group, the hydrogen bridge bond to the ε-caprolactam can also be formed via this group.

Examples of suitable polyalcohols are ethylene glycol, diethylene glycol, triethylene glycol, tetraethylene glycol, thiodiglycol, 1,2-propanediol, 1,3-propanediol, dipropylene glycol and tripropylene glycol, glycerol, trimethylolpropane, N-methyldiethanolamine, diethanolamine, triethanolamine, oxethylation products of ethanolamine, N-methyldiethanolamine, diethanolamine and triethanolamine, bis-hydroxyethyl-cyclohexylamine and the polyglycol-amines of the formula

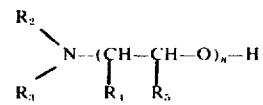

wherein
$R_2$ and $R_3$ denote alkyl or

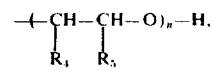

$R_4$ and $R_5$ denote hydrogen, methyl or ethyl and
n represents the numbers 1 to 20,
which are described in German Offenlegungsschrift (German Published Specification) No. 2,061,760.

Preferred polyalcohols are ethylene glycol, diethylene glycol, triethylene glycol, diethanolamine, triethanolamine and the reaction product of 1 mol of triethanolamine with 3 mols of ethylene oxide.

The association compounds of ε-caprolactam and the polyalcohols are prepared by simply fusing the ε-caprolactam with the polyalcohols or dissolving the ε-caprolactam in the polyalcohols. Further details of their preparation are described in German Offenlegungsschrift (German Published Specification) No. 2,062,288.

Suitable water-miscible organic solvents which are optionally present in the solutions are, for example, alcohols such as ethylene glycol or propylene glycol, polyglycols such as diethylene glycol or triethylene glycol, glycol ethers and polyglycol ethers such as ethylene glycol monoethyl ether and monobutyl ether or diethylene glycol monoethyl ether and monobutyl ether, alkanolamines, such as ethanolamine, diethanolamine and triethanolamine, or polyglycolamines such as are described, for example, in German Offenlegungsschrift (German Published Specification) No. 2,061,760.

Preferred water-miscible organic solvents are ethylene glycol, diethylene glycol, diethylene glycol monoethyl ether and the polyglycolamines known from German Offenlegungsschrift (German Published Specification) No. 2,061,760.

Concentrated dyestuff solutions are in particular to be understood as solutions which contain 10 to 50% by weight of dyestuff, 20 to 90% by weight of a caprolactam association compound of the formula (II), 0 to 70% by weight of water-miscible organic solvents and 0 to 70% by weight of water.

The dyestuff solutions are obtained by dissolving the azo dyestuffs containing sulphonic acid groups or anthraquinone dyestuffs containing sulphonic acid groups, optionally after pretreatment with mineral acid, in the solvents mentioned, if appropriate at an elevated temperature (approx. 40° to 60°C). The solution temperature and the solution time depend both on the dyestuff and on the solvent and can easily be determined by simple preliminary experiments. At times, the dyestuff solutions according to the invention must be filtered again to remove insoluble constituents, for example inorganic salts and other impurities.

It has already been proposed to use ε-caprolactam as such for the preparation of aqueous dyestuff solutions (for example British Pat. No. 1,060,063).

However, with such solutions it is not possible to achieve the concentrations of the solutions according to the invention without encountering problems in the use of these solutions due to ε-caprolactam which crystallises out or ε-caprolactam hydrates which crystallise out.

EXAMPLE 1

20 g of the dry, largely salt-free dyestuff of the formula

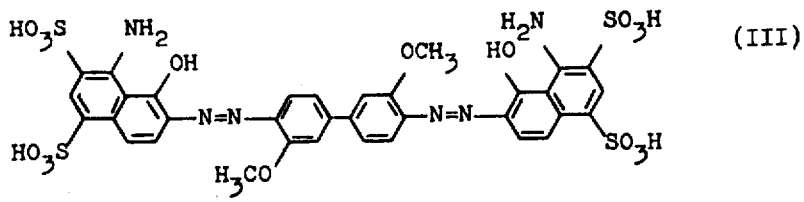

(III)

are introduced into a mixture of 20 g of caprolactam/-diethylene glycol association compound and 60 g of water at room temperature and the mixture is stirred for one hour at the same temperature. After filtering off small amounts of insoluble impurities, a dyestuff solution is obtained which shows no changes even after a period of storage of several weeks.

EXAMPLE 2

10 kg of a paper pulp, containing 4 g of cellulose per 100 g, are treated in a hollander for about 2 hours. During this time, 4 g of resin size, followed by 25 g of the dyestuff solution obtained according to Example 1, and finally followed by 5 g of aluminium sulphate, are added at intervals of quarter of an hour. After finishing on the papermaking machine, a paper which is coloured blue, of good fastness to light and to wet processing, is obtained.

EXAMPLE 3

20 g of the dry dyestuff of the formula

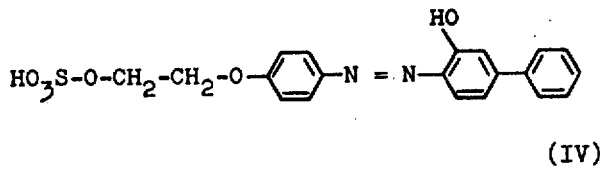

(IV)

are introduced into a mixture of 60 g of caprolactam/-polyglycolamine association compound and 20 g of polyglycolamine. The polyglycolamine is prepared by reaction of 90 g of ethylene oxide with 100 g of triethanolamine at 80°–100°C (Example 1b of German Offenlegungsschrift (German Published Specification) No. 2,061,760).

The mixture is stirred for one hour at 50°–60°C, during which the dyestuff dissolves. The solution is filtered once, to remove insoluble impurities. The dyestuff solution can be used to dye polyamides in a yellow shade in accordance with known processes.

EXAMPLE 4

30 g of the dry dyestuff of the formula

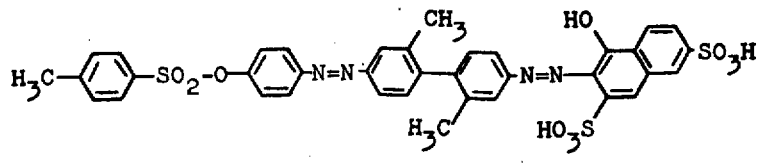

(V)

which has been pretreated with dilute hydrochloric acid are introduced, at room temperature, into a mixture of 45 g of caprolactam/ethylene glycol association compound and 25 g of the polyglycolamine used in Example 3, and the mixture is stirred for 30 minutes at 50°–60°C, during which the dyestuff dissolves, and is filtered. The dyestuff solution can be used for dyeing polyamides in a red shade, in accordance with known processes.

EXAMPLE 5

144 g of a moist filter cake which contains 108 g of 2% strength hydrochloric acid and 36 g of the practically salt-free dyestuff of the formula

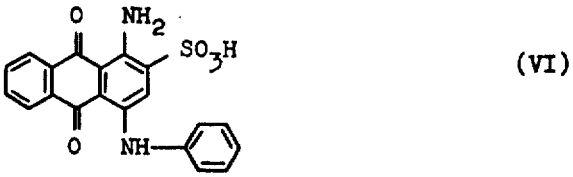

(VI)

are introduced, at room temperature, into a mixture of 30 g of caprolactam/diethylene glycol association compound, 10 g of diethylene glycol and 24 g of the polyglycolamine used in the preceding example. Water is distilled off under a pressure of 15–20 mm Hg whilst gradually raising the temperature. When the dyestuff solution has reached a temperature of 65°C, approx. 105 g of water have been distilled off. The mixture is allowed to cool to room temperature and small amounts of insoluble impurities are removed by filtration.

The dyestuff solution can be used to dye polyamides in a blue shade in accordance with known processes.

We claim:

1. Stable, concentrated solutions, miscible with water in any ratio, of azo dyestuffs containing sulphonic acid groups and anthraquinone dyestuffs containing sulphonic acid groups, characterised in that they contain association compounds of lactams with polyalcohols, either in water or in further water-miscible solvents or in a mixture of water and further water-miscible solvents.

2. Solutions according to claim 1, characterised in that they contain ε-caprolactam/polyalcohol association compounds.

3. Solutions according to claim 1, characterised in that they contain association compounds of ε-caprolactam and a polyalcohol from the series ethylene glycol, diethylene glycol, triethylene glycol, diethanolamine, triethanolamine and the reaction product of 1 mol of triethanolamine with 3 mols of ethylene oxide.

4. Solutions according to claim 1, characterised in that they contain 10 to 50% by weight of dyestuff, 20–90% by weight of lactam/polyalcohol association compound, 0–70% by weight of water-miscible organic solvents and 0–70% by weight of water.

5. Process of dyeing with the dyestuff solutions of claim 1 natural and synthetic fibre materials containing nitrogen and natural and synthetic fibre materials containing hydroxyl groups.

* * * * *